United States Patent [19]

Yang et al.

[11] Patent Number: 4,901,383
[45] Date of Patent: Feb. 20, 1990

[54] MODULAR FRAME FOR A WATER BED

[75] Inventors: Alex Yang, Yuan-Ho; Ben-Shin Liao, Taipei, both of Taiwan

[73] Assignee: Alex Yang, Yuan-Ho, Taiwan

[21] Appl. No.: 322,202

[22] Filed: Mar. 9, 1989

[51] Int. Cl.$^4$ .............................................. A47C 19/00
[52] U.S. Cl. ..................................... 5/201; 5/282 R; 5/286; 5/400; 403/205; 403/402; 403/403
[58] Field of Search ................... 5/400, 451, 201, 202, 5/200 C, 200 R, 282 R, 285, 286; 403/403, 402, 205

[56] References Cited

U.S. PATENT DOCUMENTS

| 3,999,236 | 12/1976 | Macauley | 5/400 |
| 4,077,074 | 3/1978 | Fogel | 5/451 |
| 4,334,331 | 6/1982 | Santo | 5/451 |
| 4,788,727 | 12/1988 | Liu | 5/202 |

Primary Examiner—Alexander Grosz
Attorney, Agent, or Firm—Cushman, Darby & Cushman

[57] ABSTRACT

A frame is adapted to surround a liguid-filled sack and a rigid support. The sack is placed on the upper surface of the support so as to constitute the cushion-like upper portion of a water bed. The frame has four rails which are interconnected to form a rectangular shape. The frame includes at least two, preferably four, detachably interconnected sections. The rails may be made of ethyl vinyl acetate. Alternatively, each of the rails has a tubular foam body and a rigid central rod fitted within the tubular foam body. In one embodiment, the frame includes four rails, four corner elements and four coupling units interconnecting the rails and the corner elements.

14 Claims, 6 Drawing Sheets

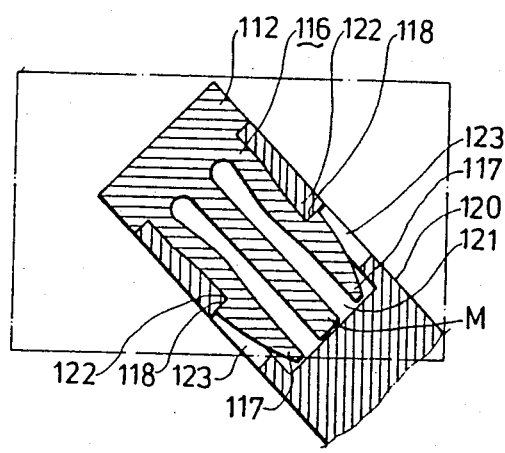
F I G. 6A
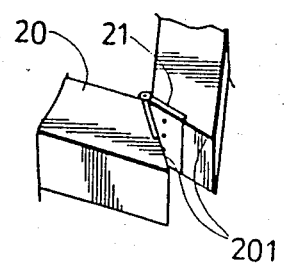
F I G. 7
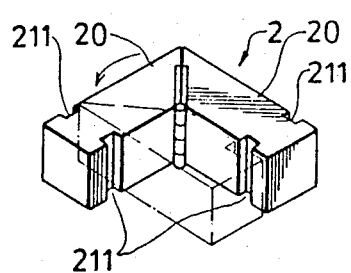
F I G. 8

MODULAR FRAME FOR A WATER BED

BACKGROUND OF THE INVENTION

This invention relates to a frame for a water bed, more particularly to a modular frame for a water bed.

To increase the feeling of comfort derived from lying on a bed, a liquid-filled sack has been placed on a bedstead to serve as a cushion. Referring to FIG. 1, a conventional water bed of this type includes a frame 92 which keeps a sack 94 in place by surrounding the same. A rigid support 93 is also enclosed by the frame 92 below the sack 94. The combined assembly of the frame 92 and the support 93 is placed on a bedstead 91 in a casing 90. The frame 92 consists of two cross rails and two side rails and comprises a unitary piece which occupies a very large space. It is difficult to carry or transport the unitary frame 92 of the prior art. Referring to FIG. 2, because the frame 92 has an upper portion 95 formed of sponge and a lower portion 96 created from a rigid foam material, when the user of such a bed repeatedly and continually lies on the sack 94 for extended periods of time, he or she causes liquid in the sack 94 to push the frame 92 outward, thereby causing said frame 92 to deform or even break.

SUMMARY OF THE INVENTION

The main object of this invention is to provide a modular frame surrounding the liquid-filled sack of a water bed.

Another object of this invention is to provide a durable frame surrounding the liquid-filled sack of a water bed.

According to this invention, a frame is adapted to surround a liquid-filled sack and a rigid support. The sack is placed on the upper surface of the support so as to constitute the cushion-like upper portion of a water bed. The frame has four rails which are interconnected to form a rectangular shape. The frame includes at least two, preferably four, detachably interconnected sections. The rails may be made of ethyl vinyl acetate. Alternatively, each of the rails has a tubular foam body and a rigid central rod fitted within said tubular foam body.

BRIEF DESCRIPTION OF THE DRAWINGS

Other features and advantages of this invention will become apparent in the following detailed description of the preferred embodiments of this invention, with reference to the accompanying drawings, in which:

FIG. 6A is a sectional view illustrating how to detachably interconnect the coupler and the connecting rod of the frame in accordance with the second embodiment of this invention;

FIG. 7 is a perspective view showing the corner element of the frame according to the second embodiment of this invention;

FIG. 8 is a schematic view illustrating how to fold the corner element of FIG. 7;

DETAILED DESCRIPTION OF THE PREFERRED EMBODIMENTS

Figures 1, 2:
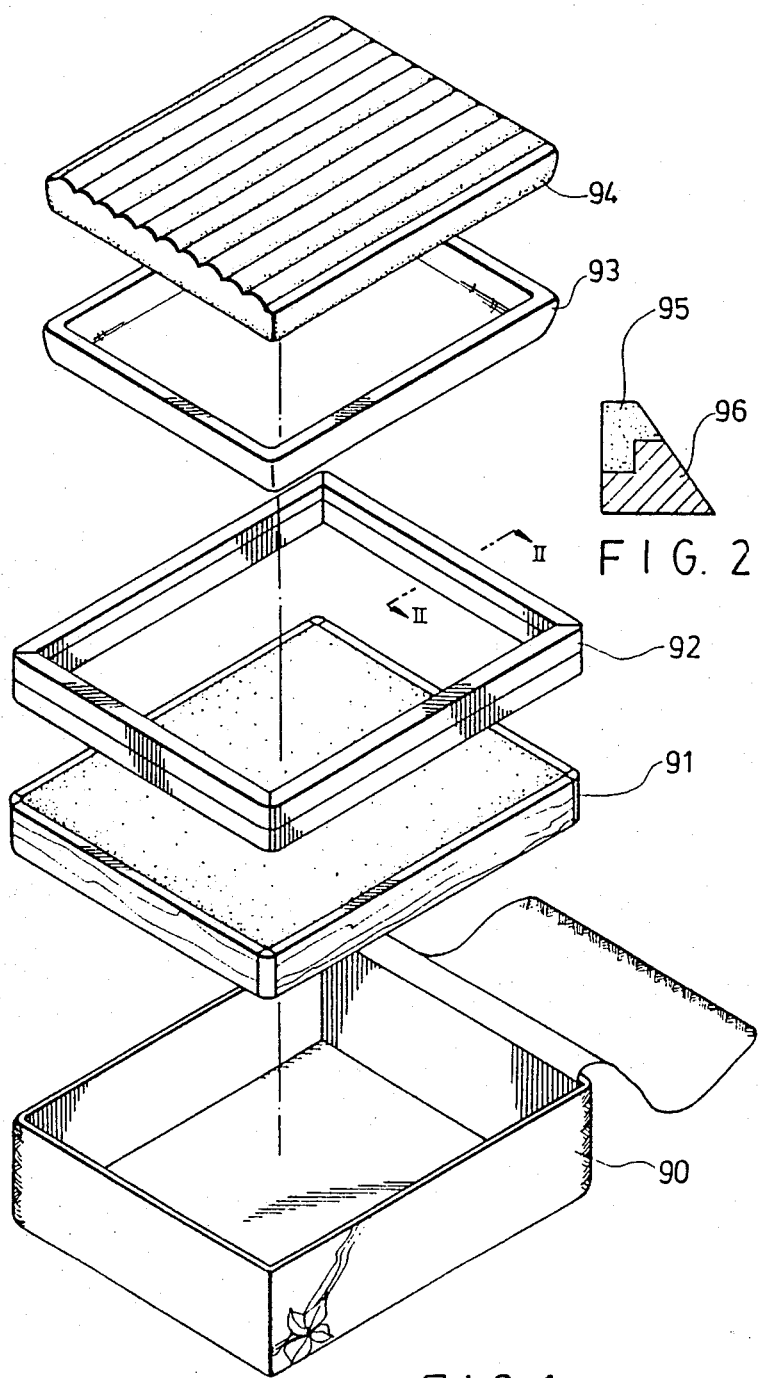
FIG. 1 is an exploded view of a conventional water bed with a liquid-filled sack.
FIG. 2 is a sectional view taken along Line II—II of FIG. 1.
Figure 3:
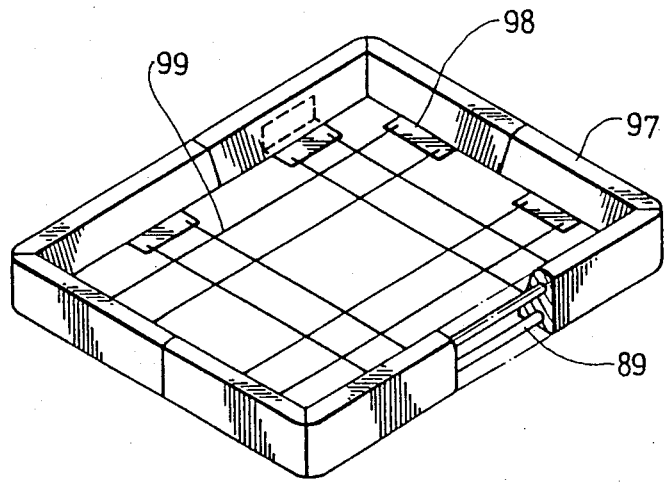
FIG. 3 is a perspective view of a frame according to a first embodiment of this invention.
Figure 4:
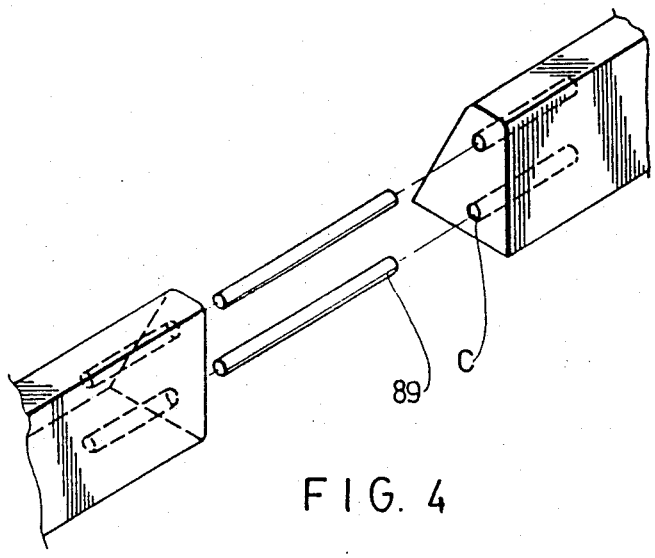
FIG. 4 is an exploded view showing the rail of the frame according to the first embodiment of this invention.

Referring to FIGS. 3 and 4, a frame of this invention includes four rails each of which has two end-to-end interconnected portions 97. As illustrated, each pair of adjacent rail 97 are interconnected securely at their adjacent ends. Two portions 97 of each rail have aligned cylindrical cavities C through which cylindrical rods 89 are passed. The portions 97 of the rails are made of ethyl vinyl acetate. Each portion 97 includes a fixed metal element 98 of an L-shaped cross-section. The metal elements 98 of each pair of aligned portions 97 of each pair of parallel rails are interconnected by two tensed nylon threads 99 so that each pair of adjacent portions 97 cannot separate from each other. When all the threads 99 are removed from the rails, each pair of adjacent portions 97 may be removed from each other. It can be appreciated that it is difficult to deform and break the frame due to the fact that the rails of the frame are made of ethyl vinyl acetate.

Figure 5:
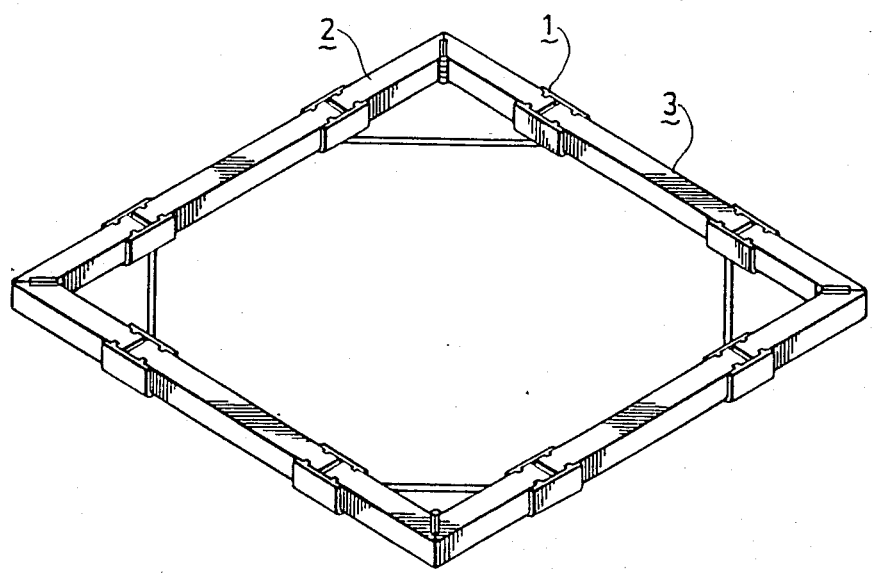
FIG. 5 is a perspective view of a frame according to a second embodiment of this invention.

Referring to FIG. 5, another frame of this invention includes four rails 3, four generally L-shaped corner elements 2 and four coupling units 1 which interconnect the rails 3 and the corner elements 2. Each of the coupling units 1 includes two couplers 11 of a U-shaped cross-section and a connecting rod 12 interconnecting said couplers 11. Each of the couplers 11 includes two upright side plates and a bottom plate 112 interconnecting said side plates 111. The side plates 111 of each coupler 11 are perpendicular to the side plates 111 of the adjacent coupler 11. Each of the side plates 111 has a first vertical rib 113 projecting from the inner wall of the inner end portion thereof, and a second vertical rib 114 projecting from the inner wall of the outer end portion thereof.

The connecting rod 12 may be soldered to the bottom plates 112 of the couplers 11.

Figure 6:
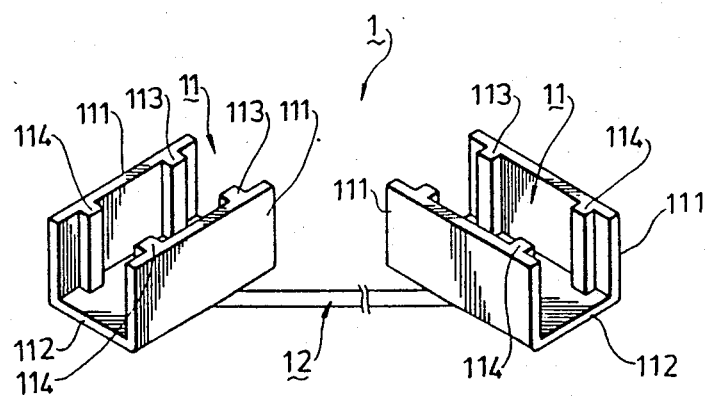
FIG. 6 is a perspective view showing the coupling unit of the frame according to the second embodiment of this invention.

A preferred embodiment is shown in FIG. 6A which reduces the space occupied by the coupling units 1 when the frame is carried.

Referring to FIG. 6A, in each of the coupling units 1, each coupler 11 is connected detachably to a socket 120 which is secured to the end of the connecting rod 12. The socket 120 includes a cavity 121 formed in the end surface thereof, two wedged retaining projections 122 extending from the inner wall defining the cavity 121, and two holes 123 formed through the wall of the socket 120. A tongue unit 116 extends downward from the bottom plate 112 and has a middle strip M and two barb-like resilient jaws 117 each of which has a retaining groove 118 formed in the outer wall of the upper end portion thereof. As illustrated, when the tongue unit 116 is inserted into the cavity 121 of the socket 120, the retaining projections 122 engage with the retaining grooves 118 so that the tongue unit 116 is retained within the socket 120. A tool may be inserted through the holes 123 to push the jaws 117 inward so as to disengage the retaining projections 122 from the retaining grooves 118, after which the tongue unit 116 may be removed from the socket 120.

Referring to FIGS. 7 and 8, each of the corner elements 2 has two arms 20 which are connected to each other at the inner sides of their inner end surfaces 201 by a hinge 21. The arms 20 of each corner element 2 have aligned oblique inner end surfaces 201. As shown in FIG. 8, when the inner end surfaces 201 of the arms 20 overlap each other, the arms 20 are perpendicular to each other. Each of the arms 20 has two open-ended vertical slots 211 formed in two sides walls of the outer end portion thereof. The outer end of each arm 20 of corner element 2 is placed on the bottom plate 112 of one coupler 11 in such a manner that the slots 211 of said arm 20 engage with the first ribs 113 of said coupler 11.

Figure 9:
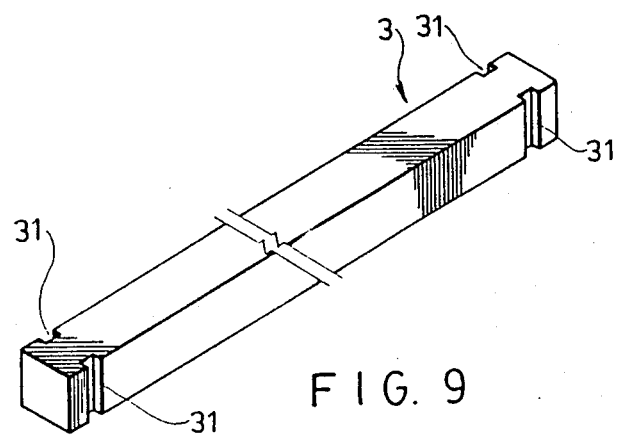
FIG. 9 is a perspective view showing the rail of the frame according to the second embodiment of this invention.
Figure 10:
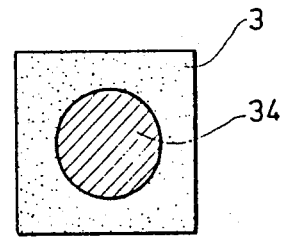
FIG. 10 is a cross-sectional view showing the rail of the frame according to the second embodiment of this invention.

Referring to FIG. 9, each of the rails 3 has two vertical slots 31 formed in two side walls of each end portion thereof. Each end portion of the rail 3 is placed on the bottom plate 112 of one coupler 11 in such a manner that the slots 31 of said rails engage with the second ribs 114 of said coupler 11. The rails 3 are preferably made of ethyl vinyl acetate. Alternatively, the rails 3 may be made of a foam material which is somewhat flexible. Because the foam material rail 3 is flexible and resilient, a reinforced metal or wooden rod 34, (see FIG. 10), may be provided through the rail 3.

Figure 11:
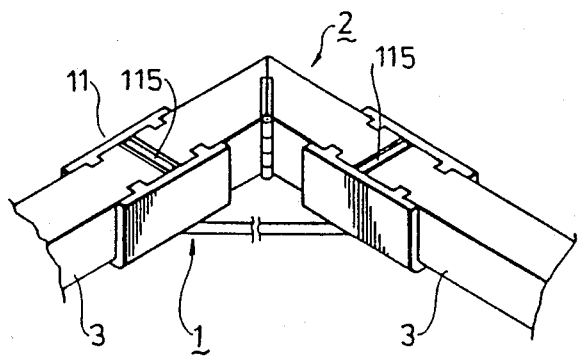
FIG. 11 is a perspective view showing the coupling unit of a frame according to a third embodiment of this invention.

Referring to FIG. 11, to prevent the side plates 111 from flexing relative to the bottom plate 112 when the user lies on the liquid-filled sack which is inside the frame, a rigid cross rod 115 may bridge the upper ends of the middle portions of the side plates 111 of one coupler 11.

Figure 12:
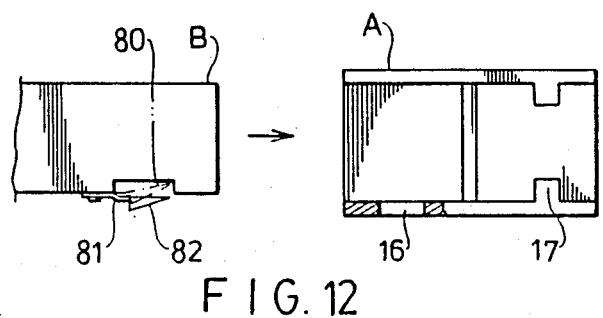
FIGS. 12 and 13 are schematic views illustrating the assembly of the rail and the coupling unit of a frame according to a fourth embodiment of this invention.
Figure 13:
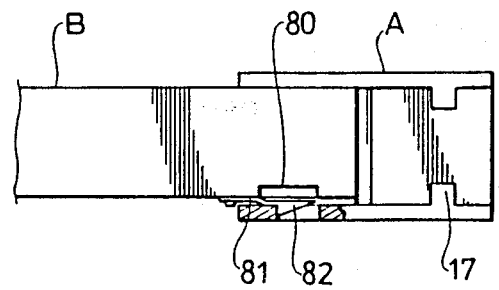

Referring to FIG. 12, the manner in which the coupler interconnects the corner element and the rail may be changed. As illustrated, the coupler A includes an engagement hole 16 formed through one side plate of one end portion thereof, and a vertical rib 17 projecting from the inner walls of the side plates of the other end portion of said coupler A. The ribs 17 are connected to the adjacent arm of rail in the same manner as that of the embodiment of FIG. 5. The rail or arm B which is connected to the left end of the coupler A includes a groove 80 formed in the side wall of the right end portion thereof, and a spring reed 81 secured to the member B at the left end thereof. The reed 81 has a barb-like right end which is aligned with the groove 80. Because the barb-like end 82 is tapered, the right end of the member B can be inserted into the coupler A so as to engage the engagement hole 16 with said barb-like end 82, thereby retaining said member B on said coupler A.

With this invention thus explained, it is apparent that numerous modifications and variations can be made without departing from the scope and spriint of this invention. It is therefore intended that this invention be limited only as indicated in the appended claims.

We claim:

1. A frame adapted to surround a liquid-filled sack and a rigid support in a manner such that said sack can be placed on an upper surface of said support so as to form a cushion-like upper portion of a water bed, said frame comprising:
    four rails interconnected to form a rectangular shape;
    at least two detachably interconnected sections;
    four generally L-shaped corner elements each having two arms interconnected at a right angle; and
    four coupling units each connecting one of said corner elements detachably to two, of said four, adjacent rails.

2. A frame as claimed in claim 1, wherein said rails are made of ethyl vinyl acetate.

3. A frame as claimed in claim 1, wherein each of said rails has a tubular foam body and a rigid central rod fitted within said tubular foam body.

4. A frame as claimed in claim 1, wherein each pair of adjacent said rails are interconnected securely at adjacent ends thereof, each of said rails including two end-to-end interconnected portions with aligned cylindrical cavities formed in adjacent end surfaces of said portions, and an cylindrical rod inserted into said cavities so that said portions are aligned with each other, each pair of aligned said portions of each pair of parallel said rails being fastened to each other.

5. A frame as claimed in claim 4, wherein each pair of aligned said portions of each pair of parallel said rails are interconnected by a tensed nylon thread so that said portions of each of said rails cannot separate from each other.

6. A frame as claimed in claim 1, wherein said arms of each of said corner elements have aligned oblique inner end surfaces and are hinged to each other at inner ends of their inner sides, whereby, when one of said corner elements is removed from associated said rails and said coupling unit, said arms of said corner element can be rotated to overlap each other.

7. A frame as claimed in claim 1, wherein each of said coupling units includes two interconnected couplers each of which connects one of said arms of corresponding said corner element to corresponding said rails, each of said couplers having an inner end connected to said arm, and an outer end connected to said rail.

8. A frame as claimed in claim 7, wherein each of said couplers has a U-shaped cross-section and includes two upright side plates and a horizontal bottom plate interconnecting lower ends of said side plates, each of said sides plate having two parallel vertical ribs respectively projecting from inner and outer end portions of an inner wall thereof, each of said rails having two first open-ended vertical slots respectively formed in two side walls of each end portion thereof and engaged with said ribs of said outer end portion of corresponding said coupler, each of said arms of said corner elements having two second open-ended vertical slots respectively formed in two side walls thereof and engaged with said ribs of said inner end portion of corresponding said coupler, whereby, each of said arms can couple with adjacent said rail between said side plates of corresponding said coupler.

9. A frame as claimed in claim 7, wherein each of said coupler includes a rigid cross rod interconnecting upper ends of middle portions of said side plates so as to prevent said side plates from flexing relative to said bottom plate when in use.

10. A frame as claimed in claim 7, wherein each of said coupling units includes a connecting rod connected securely to bottom surfaces of said couplers of said coupling unit at two ends thereof.

11. A frame as claimed in claim 10, wherein said couplers and said connecting rod are made of metal, said connecting rod being soldered to said bottom surfaces of said couplers.

12. A frame as claimed in claim 7, wherein each of said coupling units includes a connecting rod connected detachably to bottom surfaces of said couplers at two ends thereof.

13. A frame as claimed in claim 12, wherein each of said connecting rods includes two sockets disposed at two ends thereof, each of said couplers including a tongue unit projecting from a bottom surface thereof to engage with one of said sockets of corresponding said connecting rod, each of said tongue units including two resilient jaws extending therefrom, and two retaining grooves respectively formed in outer walls of said jaws, each of said sockets including two opposed retaining projections extending from an inner wall thereof to engage with said retaining grooves so as to retain said tongue unit within said socket, and two holes formed through a side wall of said socket in alignment with said resilient jaws so that a tool can be passed through said holes to push said resilient jaws, whereby, when said resilient jaws are pushed inward to disengage said retaining projections from said retainging grooves, said tongue unit can be removed from said socket.

14. A frame as claimed in claim 7, further comprising means for retaining one of said corner elements and one of said rails on corresponding said coupler, said coupler of said retaining means having two upright side plates and a horizontal bottom plate interconnecting lower ends of said side plates, one of said side plates of said retaining means including a vertical rib projecting from an inner wall of one end portion thereof, and an engagement hole formed through the other end portion of said side plate, one of said rail and said arm of said retaining means including a spring reed secured to a side wall of an end portion thereof at an inner end of said reed, said reed having a barb-like outer end which engages with said engagement hole so as to retain said reed on said coupler, the other of said rail and said arm of said retaining means having two open-ended vertical slots respectively formed in two side walls of an end portion thereof, said ribs being engaged with said slots respectively, whereby said barb-like outer end may be pushed to disengage from said engagement hole.

* * * * *